June 30, 1970   N. H. BROWN   3,518,358
CABLE OR LIKE ENCLOSURE
Filed June 19, 1967   4 Sheets-Sheet 1

INVENTOR
Norman H. Brown

BY Shoemaker and Mattare
ATTORNEYS

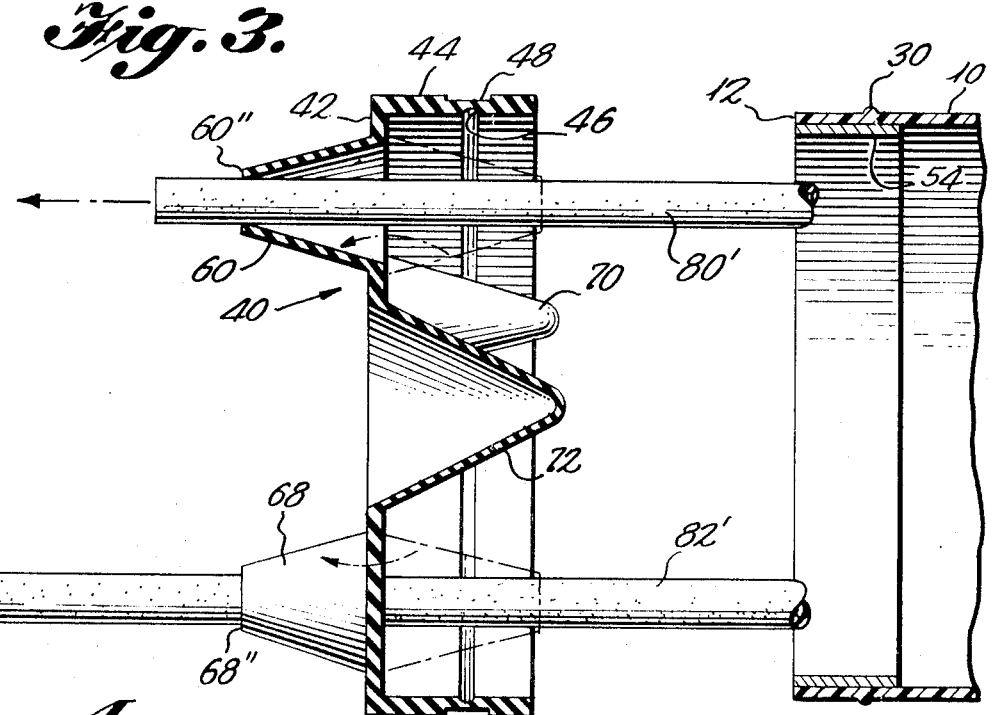
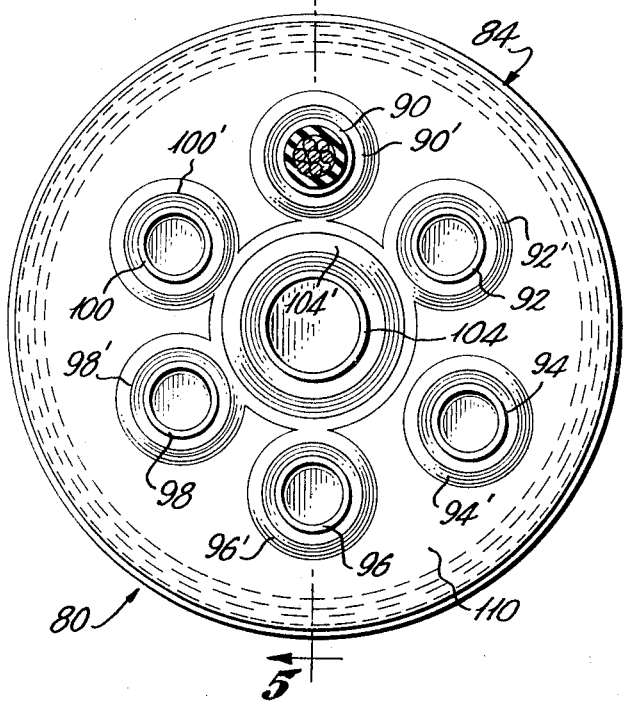
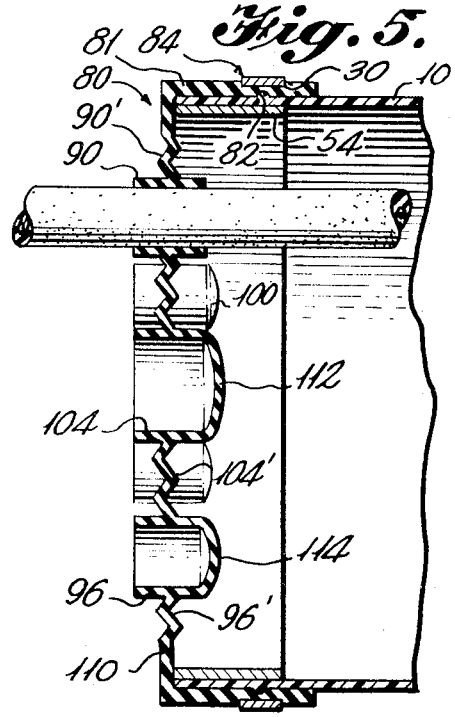

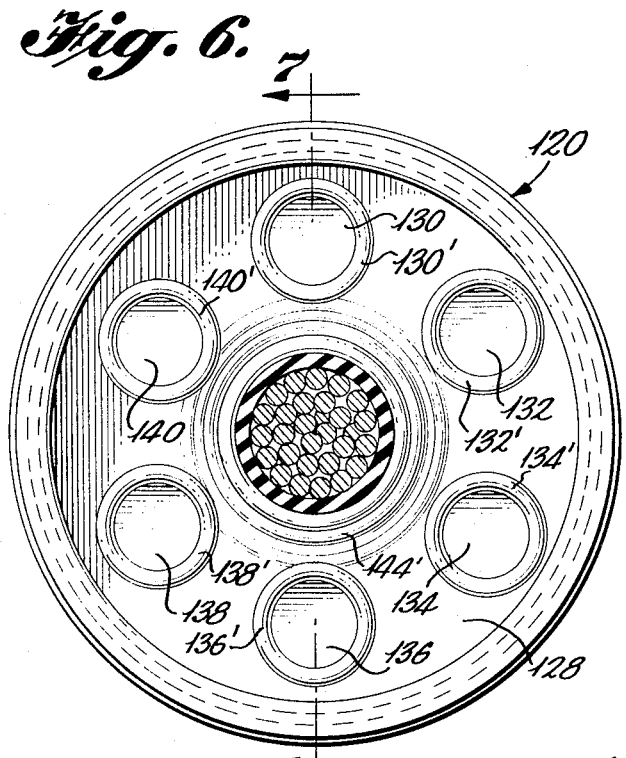
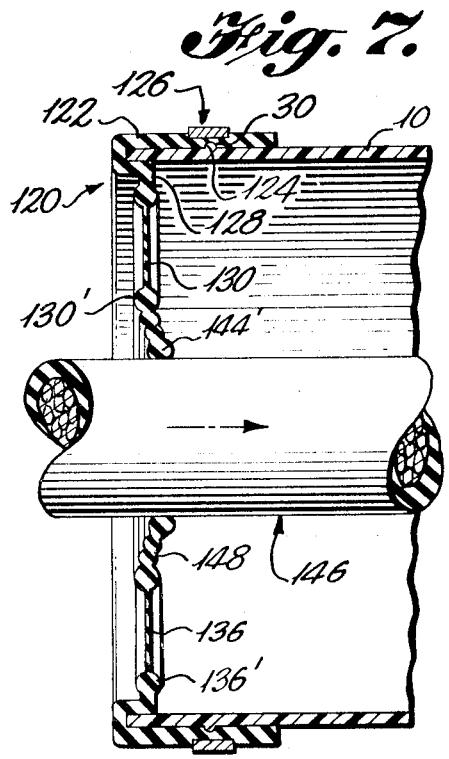
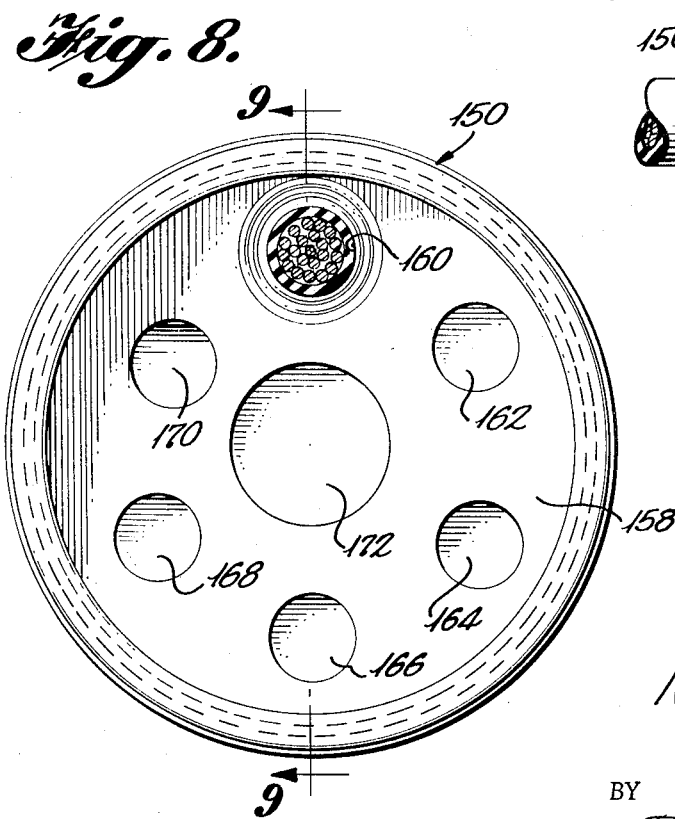
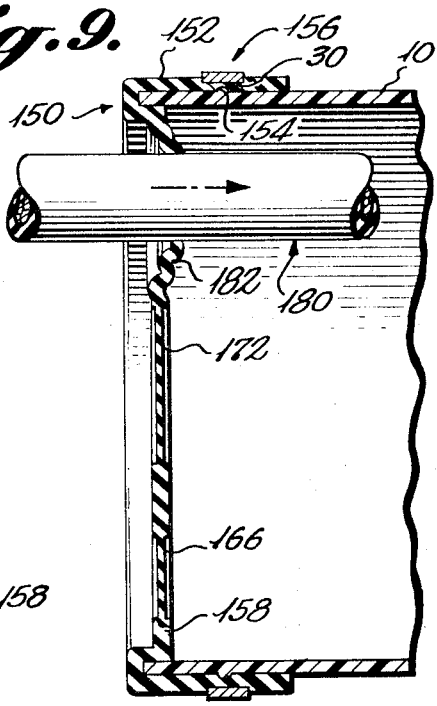

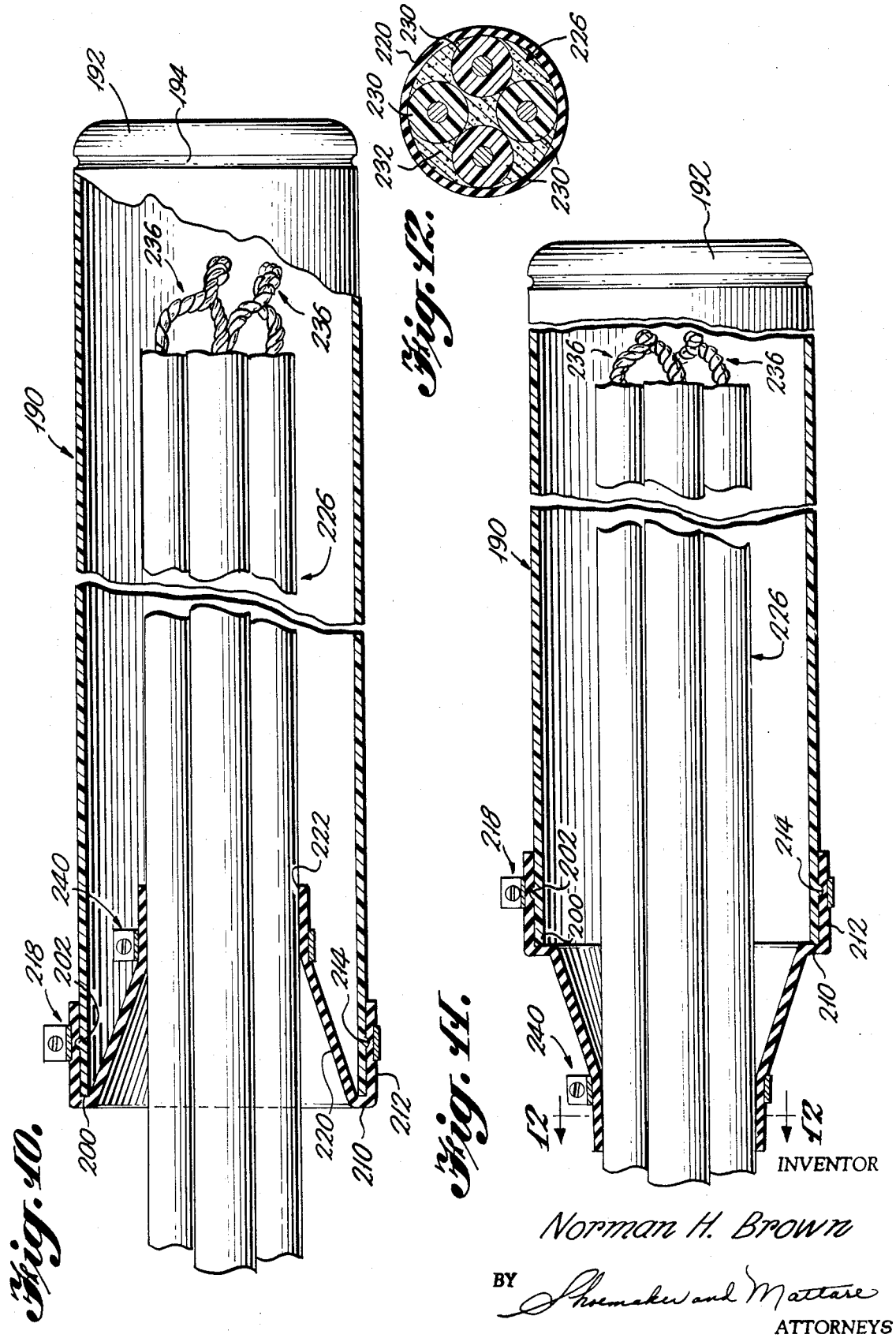

United States Patent Office 3,518,358
Patented June 30, 1970

3,518,358
CABLE OR LIKE ENCLOSURE
Norman H. Brown, Kenmore, N.Y., assignor to The Dexter Corporation, Windsor Locks, Conn., a corporation of Connecticut
Filed June 19, 1967, Ser. No. 647,019
Int. Cl. H02g 15/08
U.S. Cl. 174—138                                                  4 Claims

ABSTRACT OF THE DISCLOSURE

An end cap for tubular cable enclosures and the like which may be open at one or both ends, said end cap comprising a unitary body of resilient material having an essentially planar web portion with a peripheral flange projecting in one direction therefrom for sealingly engaging the outer surface of a tube end, one or more cable receiving apertures in said web portion, and each of said apertures being closed by an integral frusto-conical closure member protrudes from said web in the same direction as and to an extent greater than said flange, thereby facilitating accurate cut-off to closely engage a cable of particular size, and the wall thickness of said frusto-conical closure member is substantially less than that of the web so that after-desired cut-off the frusto-conical portion can be deflected to protrdue from the opposite surface of the web, in a direction opposed to the flange.

BACKGROUND OF THE INVENTION

The present invention relates to an enclosure means for enclosing one or more cable splices as used inside buildings or in sheltered areas and to provide a fluid-tight seal with respect to the associated cables.

Cable splice enclosures of this type must be capable of being installed in a minimum of time and furthermore provision must be made for re-entering the enclosure in a quick and easy manner without destroying a portion of the enclosure assembly. It is also very desirable to provide an arrangement wherein no other materials such as tape or sealing compound are required for providing a fluid-tight sealing arrangement.

Prior art arrangements for accomplishing similar purposes are illustrated in U.S. Pats. No. 3,054,847, No. 3,254,153, and No. 3,260,794. Such prior art arrangements present certain inherent problems which are solved by the present invention. Firstly, a principal problem occurring in this art is the fact that the cables to be spliced to one another and employed with the enclosure of the present invention may have widely varying outer diameters. The arrangements as shown in the prior art do not provide an effective fluid-tight contact with cables of widely varying size, and in fact are unable to accommodate cables which are not of substantially a particular size when employing one end cap. That is to say, these prior art arrangements as shown in the aforementioned patents are not so constructed and arranged as to provide a good fluid-tight seal with cables having a relatively small outer diameter, and to provide a corresponding good seal with cables having a relatively large outer diameter.

Prior art structures as shown for example in the first two-mentioned patents referred to hereinabove employ tapered portions which taper through limited lengths thereof, but which are not adapted to accommodate cables of widely varying outer diameter and furthermore these tapered arrangements are so arranged that they are adapted to receive a cable from only one side thereof, or in other words, the cable can only be inserted from one direction through the tapered cable receiving portions. This is disadvantageous since it is often desired to insert cables either in one direction or another with respect to the cable receiving portions.

Since the cable ends generally terminate all in the same direction, it is desirable to provide an enclosure having one end thereof permanently closed. On the other hand, it may be desirable to provide an arrangement wherein the closed end of the enclosure may be opened as required. The prior art arrangements as shown hereinabove do not provide such an arrangement, but rather are initially constructed so that opposite ends of the enclosure are always open and must be closed by separate end caps or closure means.

Additionally, the prior art arrangements as exemplified by the aforementioned patents are not provided with integral means for facilitating mounting of the enclosures thereby necessitating the provision of additional clamping or holding means for supporting the devices in operative position.

SUMMARY OF THE INVENTION

The present invention provides cable receiving portions which are adapted to receive cables of widely varying outer diameter. In a first form of the invention, this is accomplished by providing cable receiving portions including an open end portion and a closed end portion, the cable receiving portions tapering substantially all the way from the open end to the closed end thereof. This arrangement enables the cable receiving portions to be cut at various points therealong so as to accommodate cables of substantially different outer diameter. In a second form of the invention, the cable receiving portions are surrounded by bellows portions which permit considerable flexibility and expansion of the surrounding parts so that the cable receiving portions can accommodate cables of substantially different sipe. In further forms of the invention, the portions of the web of the end cap surrounding the cable receiving portions are adapted to wrinkle so as to provide the necessary degree of flexibility for receiving cables of different size.

The present invention also provides cable receiving portions which permit ready insertion of cables from opposite sides thereof. In the first form of the invention, the tapered cable receiving portions have a wall thickness which is substantially less than that of the associated web and which is sufficiently flexible to permit the cable receiving portion to be deformed on opposite sides of the planar web portion associated therewith so that cables can thereby be inserted from opposite directions. In the remaining forms of the invention, the cable receiving portions are adapted to readily receive cables from either end thereof.

The body means of the present invention is initially constructed so as to have one end open and the opposite end closed. The closed end of the body means is provided with a preformed cut line formed therearound which enables this end portion to be readily removed so that opposite ends of the body means can be opened. The opposite end portions of the body means are also provided with similar constructions in the form of a peripherally extending bead which is adapted to cooperate with the associated end caps so as to assist in providing an effective fluid-tight seal therewith.

The body means of the present invention is additionally provided with integral attaching means which enable the body means to be readily supported in desired operative position.

An object of the present invention is to provide a new and novel cable splice enclosure adapted to provide a fluid-tight seal with cables of widely varying size; and wherein the cables associated therewith may be readily inserted from opposite sides of the end caps; and further wherein the body means of the enclosure has a normally closed end portion which is readily removed; and wherein the body means is provided with integral attaching means to facilitate mounting of the device in operative position; and wherein it is not necessary to apply sealing material to effect a seal thereby reducing the amount of labor and cost involved.

BRIEF DESCRIPTION OF THE DRAWINGS

FIG. 3 is a sectional view similar to that shown in FIG. 2 illustrating one end portion of the apparatus with the parts disassembled with respect to one another;

FIG. 4 is an end view of a modified form of the invention;

FIG. 5 is a sectional view taken substantially along line 5—5 of FIG. 4 looking in the direction of the arrows;

FIG. 6 is an end view of a still further modified form of the invention;

FIG. 7 is a sectional view taken substantially along line 7—7 of FIG. 6 looking in the direction of the arrows;

FIG. 8 is an end view of still a further modified form of the invention;

FIG. 9 is a sectional view taken substantially along line 9—9 of FIG. 8 looking in the direction of the arrows;

FIG. 10 is a longitudinal section through a further modified form of the invention illustrating the structure in one operative position;

FIG. 11 is a view similar to FIG. 10 illustrating the structure in another operative position; and FIG. 12 is a sectional view taken substantially along line 12—12 of FIG. 11 looking in the direction of the arrows.

DESCRIPTION OF THE PREFERRED EMBODIMENTS

Figure 1:
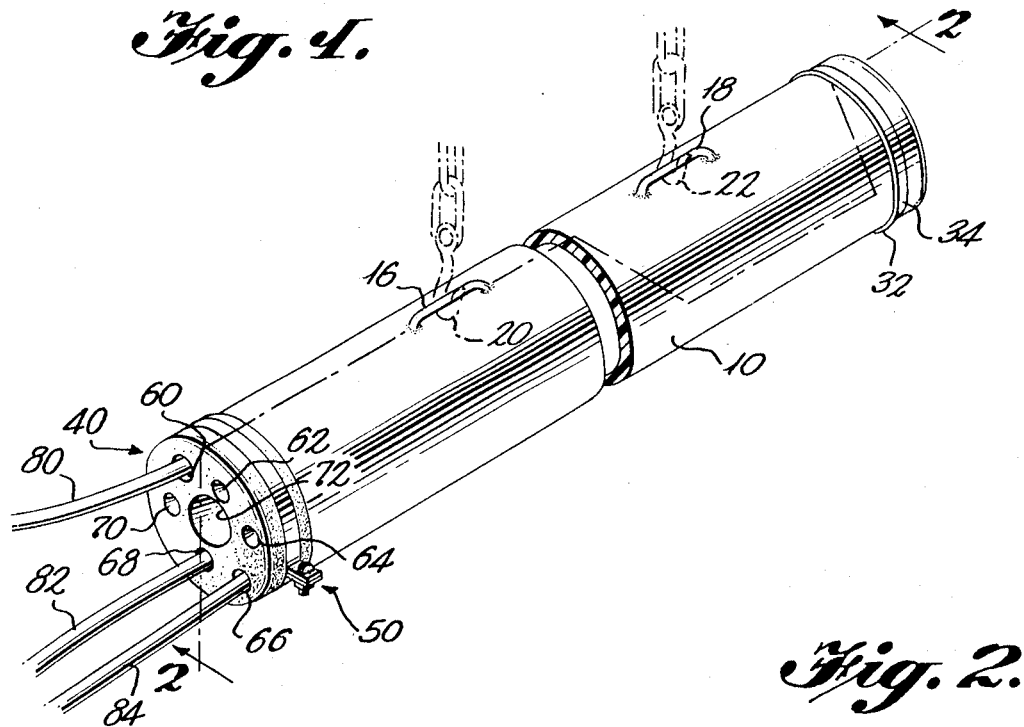
FIG. 1 is a top perspective view partly broken away illustrating a first form of the invention.
Figure 2:
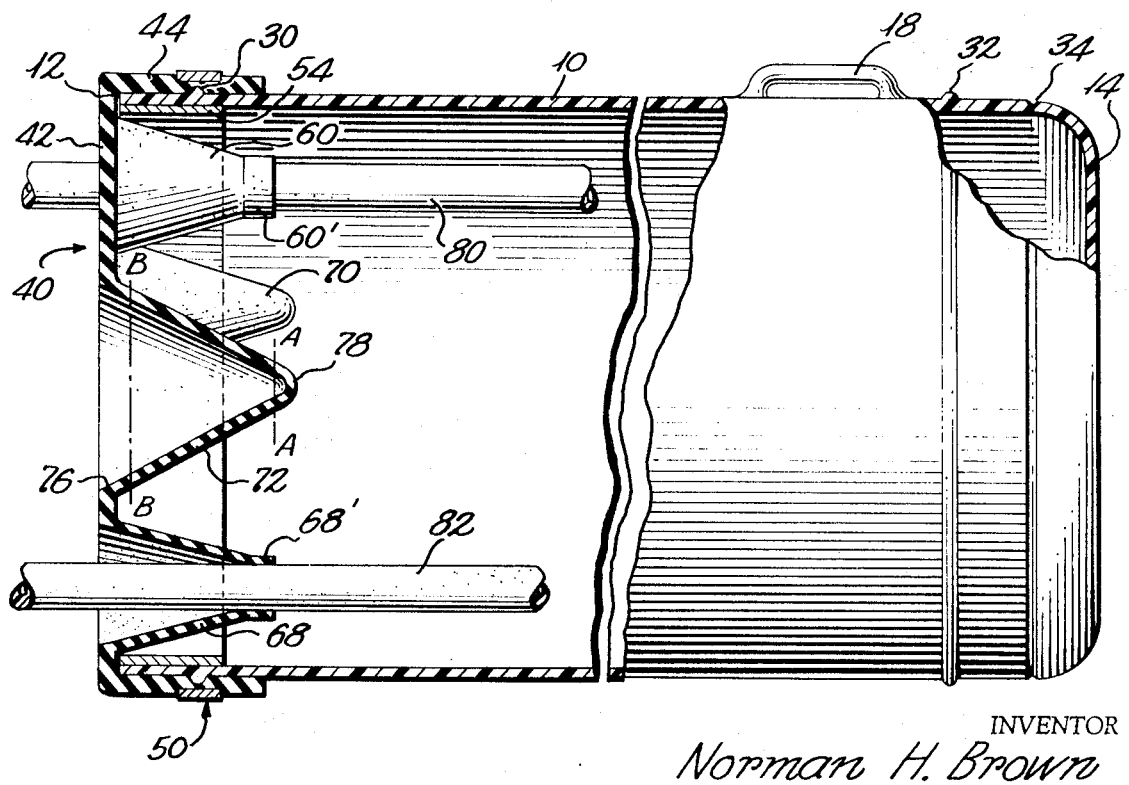
FIG. 2 is a sectional view taken substantially along line 2—2 of FIG. 1 looking in the direction of the arrows.

Referring now to the drawings wherein like reference characters designate corresponding parts throughout the several views, a first form of the invention is illustrated in FIGS. 1-3 inclusive wherein the cable splice enclosure includes a body means 10 formed of a semi-rigid material such as plastic, metal, or other suitable material or combination of the same which is adapted to hold its shape. This body means is provided with an open end 12 and a closed end 14, the body means also having a pair of integral attaching means 16 and 18 formed at longitudinally spaced portions therealong. As illustrated, portions 16 and 18 are simply loops adapted to receive suitable support means illustrated in phantom lines as being hooks in FIG. 1 of the drawing and being indicated by reference numerals 20 and 22. It will be readily understood that the integral attaching means may be of different forms, and that the means for supporting the body means in operative position will vary according to the particular application.

Body means 10 is provided with a first outwardly directed peripherally extending bead 30 of generally semi-circular cross sectional configuration which is formed around one end portion of the body means adjacent the open end 12 thereof. A similar bead 32 is provided on the body means around the end portion of the body means adjacent the closed end 14. The purposes of these beads will appear hereinafter.

A preformed cut line 34 is formed peripherally around the end portion of the body means adjacent the closed end thereof. This preformed cut line is provided for the purpose of facilitating removal of the closed end of the body means when it is desired to have opposite ends of the body means open. It will be understood that the closed end portion of the body means may be cut along this preformed cut line in any suitable manner by a conventional cutting instrument such as a knife or the like. It will of course be understood that when the closed end of the body means is removed, an end cap is adapted to be mounted thereon, such end cap being of substantially the same construction as the end cap mounted on the normally open end portion of the body means.

An end cap is indicated generally by reference numeral 40, this end cap being formed of a softer material than the body means such as rubber or the like that is adapted to fit snugly around the associated cables and the end of the body means to provide a fluid-tight seal therewith. The end cap may also be formed of other materials such as metal, plastic and the like.

The end cap includes a substantially planar relatively thin web portion 42 of a predetermined thickness which is a typical example may be on the order of $3/16$ of an inch. The end cap includes an integral flange portion 44 extending substantially normally to the web portion 42. Flange portion 44 includes a groove 46 of substantially semi-circular cross sectional configuration extending peripherally about the inner surface thereof, this groove being adapted to receive the bead 30 formed on the body means so as to assist in providing an effective fluid-tight seal therewith.

A groove 48 is formed circumferentially in the outwardly facing surface of flange 44 and is adapted to receive a conventional clamping band indicated generally by reference numeral 50, this clamping band being adjustable in the usual manner for applying the desired degree of pressure to the flange of the end cap. The end cap may also be secured in operative position on the body means as by providing a threaded interconnection or a bayonet-type connection, employed either alone or in combination with the aforedescribed clamping band.

It is apparent that when the end cap is in the assembled position shown in FIG. 2 with the clamping band 50 disposed thereabout, an effective fluid-tight seal is obtained between the end cap and the body means. A relatively rigid reinforcing ring 54 is supported within the open end of the body means 10. This reinforcing ring may be formed of a suitable material such as metal, plastic or fibrous material and the like. This reinforcing ring is not absolutely necessary, and may be eliminated in those instances wherein the body means 10 is not excessively deformed upon the application of pressure by the clamping band thereabout.

As seen most clearly in FIG. 1, a plurality of cable receiving portions are provided integrally with the end cap 40, these cable receiving portions include six portions 60, 62, 64, 66, 68 and 70 spaced about the end cap, and a central cable receiving portion 72. As used hereinafter, as well as in the claims, the term "cable receiving portion" is intended to denote a portion which is adapted to receive not only cables, but also tubes, pipes, ducts, rods and the like. It will be noted that the centers of cable receiving portions 60–70 inclusive are offset at different distances from the center of the end cap. These portions as well as the cable receiving portions of the hereinafter described modifications may also be disposed so that centers thereof lie along a circle. These portions are substantially equally spaced from one another and of a substantially uniform size. The central cable receiving portion 72 may be of a larger size for accommodating larger cables.

Referring now particularly to FIG. 2, the construction of the cable receiving portions may be clearly understood, cable receiving portion 72 being illustrated in cross section in its initial manufactured configuration, it being understood that the remaining cable receiving portions are originally of this configuration and the only difference being the relative sizes. As seen in FIG. 2, the wall portion of cable receiving portion 72 is of substantially less thickness than the thickness of the web portion 42 of the end cap, and in a typical example, may be on the order of 1/16 of an inch. In any event, the wall thickness of the cable receiving portions is substantially less than that of the web portion, and the ratio of the wall thickness of the cable receiving portions of the wall thickness of the web portion may be on the order of 1:3. Since the end cap is formed of a relatively resilient material such as rubber or the like, this enables the cable receiving portions to be readily deformed as hereinafter described.

It will further be noted that cable receiving portion 72 as well as the remainder of the cable receiving portions is provided with a so-called open end 76 and a closed end 78. The cable receiving portion tapers from a larger dimension at the open end thereof to a smaller dimension at the closed end thereof, the cable receiving portion being substantially frusto-conical in configuration and tapering substantially all of the entire distance from the open end to the closed end thereof.

As a result of this particular construction, the cable receiving portion is adapted to receive cables of widely varying outer diameter. For example, if cable receiving portion 72 were to be cut along the line a—a as seen in FIG. 2, it would then be adapted to receive a cable of relatively small outer dimension. On the other hand, if cable receiving portion 72 were to be cut along the line b—b as indicated in FIG. 2, the cable receiving portion would be adapted to receive a cable of relatively large outer dimension, and in each case, the flexible material of the cable receiving portion is adapted to fit snugly about the insulating sheath of the cable so as to provide an effective fluid-tight seal therewith.

As seen in FIG. 1, three conventional electrical cables 80, 82 and 84 are illustrated as extending through the cable receiving portions 60, 68 and 66 respectively. As seen in FIG. 2, the closed ends of the cable receiving portions 60 and 68 have been cut off to receive cables 80 and 82, the cable receiving portions being illustrated as forming annular portions 60' and 68' disposed in snug engagement with the outer insulating sheath of the cable so as to provide an effective fluid-tight seal therewith. As illustrated in this figure, each of the cable receiving portions is disposed to the right side of the planar web portion 42, and all of the cables are inserted from the left-hand side of the web portion through these cable receiving portions.

Referring now to FIG. 3, the end cap 40 is illustrated in disassembled relationship with respect to the body means 10, and in this particular figure, the cable receiving portions 60 and 68 have been deformed to the left side of the plane defined by the web portion 42. This type of deformation is readily accomplished due to the fact that the cable receiving portions are of relatively thin wall construction and of substantially less thickness than the thickness of the web portion. Additionally, the web portion itself is of a relatively thin planar construction so that the cable receiving portions formed integral therewith may be readily moved to opposite sides of the web portion.

As seen in FIG. 3, cables 80' and 82' corresponding respectively to cables 80 and 82 previously described have been inserted from the right-hand side of the web portion through the cable receiving portions 60 and 68 respectively.

Additionally, as seen in FIG. 3, the cable receiving portions 60 and 68 have been cut off so as to provide outer edges 60" and 68" respectively which are adapted to snugly engage the outer sheath of the cables 80' and 82' respectively and in this instance to provide a substantial line contact therewith. This arrangement will also provide an effective fluid-tight seal between the cable receiving portions and the associated cables.

Referring now to FIGS. 4 and 5 of the drawings, a modified form of the invention is illustrated wherein the same body means 10 as previously described is employed, this body means including the bead 30 and the reinforcing ring 54 as previously discussed.

In this form of the invention, a modified form of end cap indicated generally by reference numeral 80 is employed. The end cap includes a flange portion 81 similar to the flange portion 44 previously described, flange portion 81 having an internal peripherally extending groove 82 for receiving bead 30 of the body means, the outer periphery of flange 81 having a groove for receiving a clamping means 84 similar to the clamping means 50 previously described.

As seen most clearly in FIG. 4, this form of end cap includes a plurality of cable receiving portions including a first group of cable receiving portions 90, 92, 94, 96, 98 and 100 the centers of which are offset at different distances from the center of the end cap, these cable receiving portions being substantially equally spaced from one another. A centrally located cable receiving portion 104 is disposed within these six spaced cable receiving portions.

As seen most clearly in FIG. 5, cable receiving portions 90, 104 and 96 are shown in cross section, it being understood that the other cable receiving portions are of substantially identical construction. It will be noted that each of the cable receiving portions is generally tubular in configuration and includes parts thereof extending on opposite sides of the web portion 110 of the end cap.

As seen in FIG. 5, the inner ends of cable receiving portions 104 and 96 are closed as indicated by reference numerals 112 and 114, it being understood that each of these cable receiving portions may be initially closed in a similar manner, these closed ends being adapted to be cut off to receive cables therethrough when desired. The cable receiving portions may either be initially closed or open as desired.

In order to facilitate expansion of each of the tubular cable receiving portions so as to accommodate cables of different size, the web portions surrounding each of these cable receiving portions is of a generally bellows-like configuration so as to enable such expansion. Accordingly, the web portion is provided with bellows-like portions 90', 92', 94', 96', 98', 100' and 104' disposed in surrounding concentric relationship to the cable receiving portions 90, 92, 94, 96, 98, 100 and 104 respectively as seen most clearly in FIG. 4. It is apparent that with this arrangement, the cable receiving portions are adapted to receive cables of substantially different size, and that when the inner closed ends of the cable receiving portions have been removed, the cable receiving portions are readily adapted to receive cables from either side thereof.

Referring now to FIGS. 6 and 7 of the drawings, a further modified form of the invention is illustrated wherein the same body means 10 as previously described is employed, this body means having the bead 30 extending therearound. In this form of the invention, the reinforcing ring has been eliminated.

A modified end cap is indicated generally by reference numeral 120 and includes a flange portion 122 having an internal peripherally extending groove 124 for receiving bead 30 of the body means. The outer periphery of flange 122 is provided with a peripherally extending groove for receiving a clamping means 126 similar to the clamping means previously described.

End cap 120 includes a web portion 128 which is offset inwardly thereof as seen in FIG. 7 so as to be disposed to the right-hand side of a plane passing through the left-hand portion of the end cap as seen in FIG. 7.

This web portion as seen most clearly in FIG. 6 has a plurality of cable receiving portions 130, 132, 134, 136, 138 and 140 formed therein, the centers of these cable receiving portions being offset at different distances from the center of the end cap. As seen most clearly in FIG. 7, each of these aforementioned cable receiving portions are defined by wall portions of considerably less thickness than the wall of the web portion 128. The wall thickness of the cable receiving portions is sufficient to provide a seal, yet is so thin that it can be readily removed with a suitable tool or pushed out by the end of a cable.

It will be noted that as seen in FIG. 6, each of the cable receiving portions 130–140 is surrounded by a bead of generally circular cross sectional configuration as seen in FIG. 7, each of these beads being given the same reference numeral primed as the associated cable receiving portion. It should also be understood that a central cable receiving portion which has been removed as seen in these figures is surrounded by an integral bead 144'.

As illustrated in FIGS. 6 and 7, each of the cable receiving portions is intact except for the central cable receiving portion which has been removed. A cable 146 has been inserted through this central cable receiving portion which is of greater cross sectional dimension than the remaining cable receiving portions. As seen especially in FIG. 7, the bead 144' is disposed in tight sealing engagement with the outer surface of the cable so as to provide a fluid-tight seal therewith, and the surrounding adjacent portions 148 of the web portion of the end cap are wrinkled thereby enabling this central cable receiving portion to receive cable 146 and to be in tight sealing engagement therewith. The ability of the web portion of the end cap to wrinkle provides sufficient flexibility so that cables of substantially different size may be effectively received within the cable receiving portions thereof.

Referring now to FIGS. 8 and 9 of the drawings, a still further modified form of the invention is illustrated. Here again, the same body means 10 as previously described is employed having the peripherally extending bead 30 formed on the outer surface thereof.

This form of the invention includes a modified end cap 150 having a flange 152 extending therefrom. A peripherally extending groove 154 is formed on the inner surface of flange 152 and receives the bead 30. The outer surface of flange 152 is provided with a peripherally extending groove receiving a clamping means 156 similar to those previously discussed.

As seen most clearly in FIG. 8, the web portion 158 of the end cap is provided with cable receiving portions 160, 162, 164, 166, 168 and 170 arranged so that the centers of these portions are offset at different distances from the center of the end cap. A central cable receiving portion 172 of greater cross sectional dimension is also provided.

As seen most clearly in FIG. 9, the web portion 158 is offset inwardly from the outer left-hand edge of the end cap as seen in this figure, and each of the cable receiving portions is defined by an area of wall thickness substantially less than the wall thickness of the remaining web portions.

As illustrated in FIG. 9, a cable 180 has been inserted through cable receiving portion 160, and the surrounding adjacent portions 182 of the web portion are wrinkled or expanded radially outwardly to enable the insertion of the cable with the web portion in snug engagement with the outer surface thereof. Here again, the flexibility of the web portion permits cables of substantially different outer diameter to be effectively inserted and sealed within the cable receiving portions.

It will of course be readily apparent that cables may be inserted with equal facility from either side of the end caps as illustrated in the modification shown in FIGS. 6–9 inclusive.

Referring now to FIGS. 10 through 12 of the drawings, a further modified form of the invention is illustrated. In this form of the invention, the tubular body means 190 may be of substantially the same construction as that previously described, the tubular body means having a closed end 192 having a preformed cut line 194 formed peripherally therearound to permit ready removal if desired.

The tubular body means includes an open end portion 200 having an outwardly projecting bead 202 formed peripherally thereabout. An end cap is provided for mounting about the open end of the tubular body means, the end cap including a web portion 210 having a flange portion 212 formed adjacent the outer periphery thereof.

The inner surface of the flange portion 212 has a peripherally extending groove 214 formed therein which receives the bead 202 formed on the tubular body means. A suitable clamping means 218 similar to those previously described is seated within a circumferentially extending groove formed in the outer surface of flange portion 212 whereby the end cap may be clamped on the tubular body means.

A cable receiving portion 220 is formed integral with the web portion and is of substantially frusto-conical configuration and tapers from a larger dimension at the web portion to a smaller dimension adjacent the open end 222 thereof which is adapted to receive a bundle of cables indicated generally by reference numeral 226.

As seen in FIG. 12, the bundle of cables 226 includes a plurality of individual insulated electrical cables 230 which are held together by a body 232 of a suitable compound which is adapted to fill the space between the cables and hold them in the operative relationship shown.

Referring again to FIG. 10, the open end portion 220 of the cable receiving portion is surrounded by a suitable clamping means 240 similar to those previously described. This clamping means is adapted to be adjusted for tightly clamping the open end of the cable receiving portion about the bundle of cables to provide an effective seal therewith.

As illustrated in FIG. 10, the cable receiving portion extends inwardly from the web portion 210 so as to be disposed within the tubular body means 190. On the other hand, as seen in FIG. 11, the cable receiving portion extends outwardly from the web portion so as to extend away from the tubular body means. It is accordingly apparent that this form of the invention also permits the cable to be inserted from either direction into the end cap as desired.

The spliced ends of the cables are indicated generally by reference numeral 236 and it should be understood that any suitable splicing means may be employed, and this splicing means need not be effectively sealed since the enclosure means serves to protect and seal the spliced portions of the cables.

It is apparent from the foregoing that there is provided according to the present invention a new and novel cable splicing closure wherein the cable receiving portions thereof are of such a construction as to readily accommodate cables of widely varying size and to provide an effective fluid-tight seal with respect thereto. The cable receiving portions are also constructed so as to permit ready insertion of cables from either side thereof. The body means is originally provided with an open end and a closed end, this closed end including a preformed cut line which permits ready removal of a portion thereof so as to provide opposite open ends to the body means when desired. The body means also includes integral attaching means so as to facilitate mounting of the apparatus in operative position.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

What I claim is:

1. An improved end cap for cable or like enclosures wherein a tubular body open at at least one end is adapted to house cable splices with cables protruding through an end cap interfitting with such open end, said improved end cap comprising a unitary body of resilient material having an essentially planar web portion with a peripheral flange projecting in one direction therefrom having means for sealingly engaging the outer surface of said body adjacent such open end thereof, the surface of said web portion opposed to said flange exposing a cable receiving opening permitting a cable to pass through said web portion, a frustoconical closure member integral with said web and joining said web peripherally of said cable receiving opening, said frustoconical closure member tapering to a closed end and protruding from said web in the same direction as said flange and to an extent somewhat greater than the width of said flange, thereby facilitating the cutting of said frustoconical closure member at a position to provide sealing engagement with a cable passed therethrough, and the wall thickness of said frustoconical closure member being substantially less than the thickness of said web portion thereby facilitating flexible displacement of said frustoconical portion to extend through said cable receiving opening and project from the first named surface of said web.

2. An improved end cap for cable or like enclosures as defined in claim 1, wherein the ratio of wall thickness of said web to wall thickness of said frustoconical closure is approximately a 3:1 ratio.

3. An improved end cap for cable or like enclosures as defined in claim 1, wherein the web portion of said end cap has a plurality of cable receiving openings with each of said openings having associated therewith a frustoconical closure normally protruding from said web in the same direction as said flange.

4. An improved end cap for cable or like enclosures as defined in claim 3, wherein the cable receiving openings in said web portion are of at least two different sizes and said frustoconical closure members correspondingly differ in size and degree of extension from said web.

References Cited

UNITED STATES PATENTS

| | | | |
|---|---|---|---|
| 3,209,069 | 9/1965 | Ruddell | 174—138.4 |
| 1,800,578 | 4/1931 | Webb | 174—152.2 XR |
| 2,862,042 | 11/1958 | Bollmeier | 174—93 |
| 2,932,685 | 4/1960 | Ralia et al. | 174—93 XR |
| 2,943,140 | 6/1960 | Bender | 174—93 |
| 2,959,431 | 11/1960 | Foss | 277—211 |
| 2,978,533 | 4/1961 | Colbert | 174—93 |
| 3,173,989 | 3/1965 | Neaderland | 174—93 XR |
| 3,254,153 | 5/1966 | Kohler | 174—93 |
| 3,260,794 | 7/1966 | Kohler | 174—93 XR |

FOREIGN PATENTS

| | | |
|---|---|---|
| 693,371 | 7/1953 | Great Britain. |
| 173,021 | 10/1963 | Sweden. |

OTHER REFERENCES

Hochstetter, German printed application No. H 22,126, pub. Aug. 16, 1956, 174—153G.

DARRELL L. CLAY, Primary Examiner

U.S. Cl. X.R.

174—93